United States Patent [19]
Sivaram et al.

[11] Patent Number: 5,955,554
[45] Date of Patent: Sep. 21, 1999

[54] PROCESS FOR POLYMERIZATION AND COPOLYMERIZATION OF OLEFINS

[75] Inventors: Swaminathan Sivaram, Pune; Soumen Sensarma, Barasat, both of India

[73] Assignee: Council of Scientific Industrial Research, New Delhi, India

[21] Appl. No.: 08/856,192

[22] Filed: May 14, 1997

[30] Foreign Application Priority Data

Mar. 27, 1997 [IN] India ................................ 801/DEL/97

[51] Int. Cl.$^6$ ...................................................... C08F 5/49
[52] U.S. Cl. ...................................... 526/124.5; 526/124.2
[58] Field of Search ............................... 526/124.2, 124.5

[56] References Cited

U.S. PATENT DOCUMENTS 5,106,804   4/1992   Bailly et al. ......................... 520/124.8

Primary Examiner—Melvyn I. Marquis
Assistant Examiner—D. Aylward
Attorney, Agent, or Firm—Birch, Stewart, Kolasch & Birch, LLP

[57] ABSTRACT

The invention relates to a process for the polymerization and co-polymerization of olefins, which comprises polymerizing/copolymerizing olefins in presence of a solvent, a supported metallocene catalyst and an aluminoxane as cocatalyst in a hydrocarbon medium, at a temperature in the range of 50 to 150° C., at a pressure ranging between 1 to 20 bar, for a period of 10 minutes to 10 hours, scavenging the reaction mixture by addition of an organoaluminum compound to remove the last traces of impurities of solvent, separating the polymer by conventional method like, washing the polymer with an organic solvent and drying the polymer to remove the solvent to obtain the product.

21 Claims, No Drawings

PROCESS FOR POLYMERIZATION AND COPOLYMERIZATION OF OLEFINS

FIELD OF THE INVENTION

This invention relates to a process for polymerization and copolymerization of olefins. More particularly, it relates to the process of polymerization and copolymerization using a solid catalyst capable of producing olefin polymers and copolymers with high catalyst activity especially at high temperatures. Still more particularly, it relates to the process using an improved metallocene catalyst supported on magnesium halides more preferably magnesium chloride.

PRIOR ART

A number of patents e.g. JP 05, 125, 112; JP 05, 51, 411; JP 05, 320, 237; JP 05, 186, 524 (Mitsui Toatsu Chemicals) describe magnesium chloride supported zirconium based metallocene catalysts used for the polymerization of propylene. A few patents are available in the literature for the polymerization of ethylene using magnesium chloride supported metallocene catalysts.

According to Eur. Pat. Appl. No. EP 576, 213 (Mitsubishi Petrochemical (Co. Ltd.), polyethylene can be produced with the aid of a solid catalyst comprising of zirconium based metallocene supported on magnesium chloride-2-ethylhexanol. However, the catalyst thus obtained was found to be less active with a broad molecular weight distribution, 3.59.

JP 04, 275, 511, (Idemitsu Petrochemical Co. Ltd.) describes another magnesium ethoxide supported metallocene catalyst used for the suspension polymerization of ethylene in n-heptane. However, magnesium alkoxide support depresses polymerization activity.

Eur. Pat. Appl. No. EP 435, 514 and EP 436, 326 (BP Chemicals Ltd. describes a solid supported zirconocene catalyst useful for the polymerization of ethylene in suspension and also in gas-phase. The support was prepared by a reaction of di-n-butylmagnesium with a tertiary butyl halide in presence of an ether such as dilsoamyl ether with or without an alcohol such as, n-butanol in an aliphatic hydrocarbon medium. These catalysts are prepared by a multi step process involving compounds such as ether/alcohols in the catalyst forming steps. Ethers/alcohols are known to react with organoaluminum compounds and hence precise control of their proportions is necessary during catalyst preparation. Otherwise, catalyst with poor or irreproducible properties will be obtained.

During the course of their research the inventors of the present invention have developed a novel method of preparation of a magnesium chloride supported zirconium based metallocene catalysts confers unexpected benefits in terms of catalyst activity, molecular weight distribution and molecular weight.

SUMMARY OF THE INVENTION

Accordingly, the present invention provides a process for polymerization and copolymerization of olefins using a catalyst comprising of Mg halides more particularly, Cl, an electron donor compound such as tetrahydrofuran (described herein after THF), and a neutral metallocene compound. The applicants, described and claimed a process for the preparation of this supported metallocene catalyst which is capable of being employed in the present polymerization and copolymerization of olefins especially ethylene in our copending which U.S. Ser. No. 08/856,191 filed on May 14, 1997, pending.

OBJECTS AND DETAILED DESCRIPTION OF THE INVENTION

Accordingly, an object of the present invention is to provide a process for polymerization and copolymerization of olefins using said solid catalyst having high catalytic activity at low aluminum to metal mol ratio with excellent particle characteristics.

Another object of the present invention is to provide a process which could be carried out at especially at high temperatures and capable of being used either in gas or slurry phase.

Still another object of the invention is to provide a process for the polymerization and copolymerization of olefins, which comprises polymerizing/copolymerizing olefins in presence of a solvent, a supported metallocene catalyst and an aluminoxane as cocatalyst in a hydrocarbon medium, at a temperature in the range of 50 to 150° C., preferably 40 to 125° C. at a pressure ranging between 1 to 20 bar, preferably 1 to 10 bar, for a period of 10 minutes to 10 hours, preferably 15 minutes to 60 minutes, scavenging the reaction mixture by addition of an organoaluminum compound to remove the last traces of impurities of solvent, separating the polymer by a conventional method like, washing the polymer with an organic solvent and drying the polymer to remove the solvent to obtain the product.

In an embodiment of the present invention, the olefin used is selected from ethylene, propylene, α-olefins, preferably ethylene.

In one more embodiment of the present invention, the mixture of olefin monomers used for the co-polymerization may consist of ethylene and a second monomer which may be selected from propylene, 1-butene, 1-hexene, 1-octene, 4-methyl-1-pentene, and cyclic olefins such as norbornene, cyclohexene, 2-vinyl-5-norbornene.

In another embodiment of the present invention, the solvent used in the reaction is selected from toluene, xylene, n-hexane, n-heptane, preferably, xylene.

In a preferred embodiment of the invention, the supported metallocene catalyst used for the polymerization of the olefins has the formula:

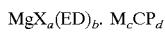

$$MgX_a(ED)_b \cdot M_cCP_d$$

wherein X is selected from the group consisting of Cl, Br, I, preferably Cl;
M indicates the transition metal which are chosen from the groups IIB, IIIB, IVB, VB, VIB of the Periodic Table;
ED is an electron donor compound;
a is 1 to 30, preferably 2 to 3.5;
b) is 2 to 80, preferably 1.5 to 3;
c is 0.001 to 0.1;
d is 0.002 to 0.2;
CP=Cyclopentadienyl; and
perferably the formula is $MgCl_{2.1}THF_{2.01}Zr_{0.017}CP_{0.034}$
wherein THF=tetrahydrofuran.

In an embodiment of the invention, the support consists of magnesium halide preferably dichloride and ED is added in relative molar percentages of about 25 to 50 mol % preferably of about 30 to 45 mol % and most preferably of about 32 to 40 mol % of magnesium dichloride and from 40 to 80 mol %, preferably from 45 to 75 mol % and especially from 50 to 70 mol %. The catalyst consists of particles which have a surface area of about 10 to 70 m²/g, preferably of about 15 to 30 m²/g.

In the present invention, the zirconium metallocene is present in the solid catalyst with a Zr/Mg molar ratio preferably ranging from 0.001 to 0.1, especially from 0.01 to 0.05.

In yet another embodiment, the aluminoxane co-catalyst used may be selected from methylaluminoxane, ethylaluminoxane, hexaisobutyl-aluminoxane, preferably, methylaluminoxane.

In yet another embodiment of the present invention, the metallocene catalyst is partially or completed soluble in the solvent.

In yet another embodiment of the present invention, the mole ratio of Al/Zr ranges between 500 to 10,000 preferably 1000 to 5000.

In still another embodiment, the organoaluminium compound used is selected from trimethylaluminium, triisobutylauminium, triethylaluminium preferably trimethylaluminium.

In another feature of the present invention, the solid catalyst prepared as per the procedure described and claimed in our copending U.S. Ser. No. 08/856,191 has Zr, Cl, Mg, and THF in the wt % 0.65, 21, 10, 65 respectively. The quantities of the components used for preparing the solid catalyst may be such that:

a) the molar ratio of Zr to Mg in the solid catalyst is in the range of 2 to 8, preferably 0.01 to 0.05
b) the molar ratio of dichloroalkane to Mg is in the range of 2 to 8, preferably of 3 to 6.

The yet another feature of the present invention, ethylene polymerization was conducted in any polymerization reactor and process including solution, slurry, and gas phase using these procedure well established in the literatures. It is preferred that polymerization occurred in a slurry process. Polymerizations were performed using the prescribed amount of catalyst as described in our copending U.S. Ser. No 08/856,191 in presence of aluminoxane as cocatalyst, especially, methylaluminoxane was used. Polymerization was performed keeping Al/Zr mol ratio of about 100 to 10,000 preferably, of about 500 to 5000. Polymerization was conducted in an aromatic and aliphatic hydrocarbon medium where the catalyst is partially or completely insoluble. The solvent used for this present invention may be aromatic hydrocarbon or may be aliphatic hydrocarbon. Among the aromatic hydrocarbon xylene or toluene can be used of which xylene is preferred. Among the aliphatic hydrocarbon n-heptane, n-hexane can be used of which n-heptane is preferred. The solvent should be absolutely free from moisture and impurities. The last traces of impurities can be further removed by addition of some organoaluminum compound such as trimethylaluminum, triisobutylaluminum, triethylaluminuin to the polymerization medium prior to introduction of catalyst.

The olefin polymerization is carried out in the presence of the catalyst for olefin polymerization at a temperature of usually −50 to 150° C. preferably 55 to 125° C., at a pressure of usually normal pressure to 1 to 10 bar , preferably 1 bar to 5 bar, for a period of 10 minutes to 12 hours, preferably, from 15 minutes to 60 minutes. Moreover, polymerization can be carried out by setting different reaction conditions. The molecular weight of the produced polyolefin can be adjusted by introducing hydrogen in the polymerization system, or by chancing the polymerization temperature.

The catalyst can also be used for copolymerzation of ethylene with other monomers, such as propylene, 1-butene, 1-hexene, 4-methyl-1-pentene, 1-octene as well as cyclic olefins such as norbornene.

The process of the present invention is described herein below with examples which are illustrative only and should not be construed to limit the scope of the present invention in any manner.

EXAMPLE-1

All glass equipments were heated in vacuo and flushed with nitrogen. All manipulations involving air-sensitive compounds were performed inside a Labconco Model 50004 inert atmosphere glove box continuously purged with high purity $N_2$ from a generator (Spantech Model NG 300-1) or under a positive pressure of high purity $N_2$ using standard bench top inert atmosphere techniques. The solvent used for polymerization such as xylene and n-heptane used in each case freshly distilled over sodium under $N_2$. The intrinsic viscosities of the polymers obtained from the present invention were determined in decalin as solvent at 135° C. using an Ubbelohde viscometer. MAO was added as a 5.4 wt % (as Al) solution in toluene. The MAO (Witco Company) as obtained had a Me/Al ratio 1.7, free trimethylaluminum 31 wt % and Al content 10.9 wt % in toluene. Crystallinity of the copolymer was determined by differential Scanning Calorimetry (DSC). Polydispersities and the molecular weight distribution of the polymers were measured by GPC (Waters 150C ALC/GPC) at 135° C. in 1,2,4-trichlorobenzene. $\mu$-Styragel columns $10^5$, $10^4$, $10^3$, 500 Å were used and the peaks were calibrated using a standard polystyrene. A 0.3–4% w/v solution was used data flow rate of 1.0 mL/min.

EXAMPLE-2

Polymerization of ethylene was performed in a stirred glass cell at one atmosphere pressure using xylene as diluent. A gas burette with a reservoir containing silicone oil was used to feed ethylene continuously to the cell. The reaction cell was dried at 155° C. overnight and cooled under ethylene. 8.3 mg, catalyst ($6.09 \times 10^{-7}$ mol as Zr) was transferred into the cell inside the glove-box. Xylene (50 mL) was introduced into the cell using a hypodermic syringe. Polymerization was initiated by the addition of MAO in toluene ($3.05 \times 10^{-4}$ mol as Al), keeping Al/Zr mol ratio 5000. The reaction temperature was maintained at 70° C. by circulating water from a thermostat through the jacket of the cell and the gas-burette. Ethylene uptake was measured as function of time. The reaction was terminated after ½ h by addition of acidified methanol. The polymer was filtered, washed with methanol and dried at 40° C. under vacuum.

Yield: 1.65 g
Activity: 59 Kg PE/g-Zr.h
Intrinsic viscosity: 1.35 dL/g; MWD: 2.43

EXAMPLE-3

Polymerization of ethylene was performed in a stirred glass cell at one atmosphere pressure using xylene as diluent. A gas burette with a reservoir containing silicone oil was used to feed ethylene continuously to the cell. The reaction cell was dried at 155° C. overnight and cooled under ethylene. 8.1 mg catalyst ($5.96 \times 10^{-7}$ mol as Zr) was transferred into the cell inside the glove-box. Xylene (50 mL, previously treated with trimethylaluminum) was introduced into the cell using a hypodermic syringe. Polymerization was initiated by the addition of MAO in toluene ($3.0 \times 10^{-3}$ mol as Al), keeping Al/Zr mol ratio 5000. The reaction temperature was maintained at 70° C. by circulating water from a thermostat through the jacket of the cell and the gas-burette. Ethylene uptake was measured as a function of time. The reaction was terminated after ½ h by addition of acidified methanol. The polymer was filtered, washed with methanol and dried at 40° C. under vacuum.

Yield: 2.4 g
Activity: 88 Kg PE/g-Zr.h
Intrinsic viscosity: 1.25 dL/g; MWD: 2.51

EXAMPLE-4

Polymerization of ethylene was performed in a stirred glass cell at one atmosphere pressure using xylene as diluent. A gas burette with a reservoir containing silicone oil was used to feed ethylene continuously to the cell. The reaction cell was dried at 155° C. overnight and cooled under ethylene. 8 mg catalyst ($5.93 \times 10^{-7}$ mol as Zr) was transferred into the cell inside the glove-box. Xylene (50 mL, previously treated with triisobutylaluminum) was introduced into the cell using a hypodermic syringe. Polymerization was initiated by the addition of MAO in toluene ($3.0 \times 10^{-3}$ mol as Al), keeping Al/Zr mol ratio 5000. The reaction temperature was maintained at 70° C. by circulating water from a thermostat though the jacket of the cell and the gas-burette. Ethylene uptake was measured as a function of time. The reaction was terminated after ½ h by addition of acidified methanol. The polymer was filtered washed with methanol and dried at 40° C. under vacuum.

Yield: 0.26 g Activity: 9.4 Kg PE/g-Zr.h MWD: 1.85

EXAMPLE-5

Polymerization of ethylene was performed in a stirred glass cell at one atmosphere pressure using xylene as diluent. A gas burette with a reservoir containing silicone oil was used to feed ethylene continuously to the cell. The reaction cell was dried at 155° C. overnight and cooled under ethylene. 8.1 mg catalyst ($5.96 \times 10^{-7}$ mol as Zr) was transferred into the cell inside the glove-box. Xylene (50 mL, previously treated with trimethylaluminum in order to remove the impurities) was introduced into the cell using a hypodermic syringe. Polymerization was initiated by the addition of MAO in toluene ($3.0 \times 10^{-3}$ mol as Al), keeping Al/Zr mol ratio 5000. The reaction temperature was maintained at 80° C. by circulating water from a thermostat through the jacket of the cell and the gas-burette. Ethylene uptake was measured as a function of time. The reaction was terminated after ¼ h by addition of acidified methanol. The polymer was filtered, washed with methanol and dried at 40° C. under vacuum.

Yield: 1.9 g Activity: 141 Kg PE/g-Zr.h Intrinsic viscosity: 0.733 dL/g;
MWD: 2.35.

EXAMPLE-6

Polymerization of ethylene was performed in a stirred glass cell at one atmosphere pressure using n-heptane as diluent. A gas burette with a reservoir containing silicone oil was used to feed ethylene continuously to the cell. The reaction cell was dried at 155° C. overnight and cooled under ethylene. 13.6 mg catalyst ($9.98 \times 10^{-7}$ mol as Zr) was transferred into the cell inside the glove-box. n-heptane (50 mL) was introduced into the cell using a hypodermic syringe. Polymerization was initiated by the addition of MAO in toluene ($5.0 \times 10^{-4}$ mol as Al), keeping Al/Zr mol ratio 1000. The reaction temperature was maintained at 70° C. by circulating water from a thermostat through the jacket of the cell and the gas-burette. Ethylene uptake was measured as function of time. The reaction was terminated after ¼ h by addition of acidified methanol. The polymer was filtered, washed with methanol and dried at 40° C. under vacuum, Yield: 0.53 g Activity: 23 Kg PE/g-Zr.h Intrinsic viscosity: 1.75 dL/g;
MWD: 2.28

EXAMPLE-7

Polymerization of ethylene was performed in a stiffed glass cell at one atmosphere pressure using n-heptane as diluent. A gas burette with a reservoir containing silicone oil was used to feed ethylene continuously to the cell. The reaction cell was dried at 155° C. overnight and cooled under ethylene. 11.6 mg catalyst ($8.52 \times 10^{-7}$ mol as Zr) was transferred into the cell inside the glove-box. n-heptane (50 mL) was introduced into the cell using a hypodermic syringe. Polymerization was initiated by the addition of MAO in toluene ($4.31 \times 10^{-4}$ mol as Al), keeping Al/Zr mol ratio 5000. The reaction temperature was maintained at 70° C. by circulating water from a thermostat through the jacket of the cell and the gas-burette. Ethylene uptake was measured as function of time. The reaction was terminated after ½ h by addition of acidified methanol. The polymer was filtered, washed with methanol and dried at 40° C. under vacuum.

Yield: 1.85 g Activity: 38 Kg PE/g-Zr.h Intrinsic viscosity: 1.24 dL/g;
MWD: 2.16

EXAMPLE-8

Polymerization of ethylene was performed in a stirred glass cell at one atmosphere pressure using n-heptane as diluent. A gas burette with a reservoir containing silicone oil was used to feed ethylene continuously to the cell. The reaction cell was dried at 155° C. overnight and cooled under ethylene. 11.3 mg catalyst ($8.29 \times 10^{-7}$ mol as Zr) was transferred into the cell inside the glove-box. n-heptane (50 mL) was introduced into the cell using a hypodermic syringe. Polymerization was initiated by the addition of MAO in toluene ($4.3 \times 10^{-4}$ mol as Al), keeping Al/Zr mol ratio 5000. The reaction temperature was maintained at 50° C. by circulating water from a thermostat through the jacket of the cell and the gas-burette. Ethylene uptake was measured as function of time. The reaction was terminated after ½ h by addition of acidified methanol. The polymer was filtered, washed with methanol and dried at 40° C. under vacuum.

Yield: 0.81 g Activity: 21 Kg PE/g-Zr. h Intrinsic viscosity: 3.31 dL/g

EXAMPLE-9

Polymerization of ethylene was performed in a stirred glass cell at one atmosphere pressure using n-heptane as diluent. A gas burette with a reservoir containing silicone oil was used to feed ethylene continuously to the cell. The reaction cell was dried at 155° C. overnight and cooled under ethylene. 11.0 mg catalyst ($8.07 \times 10^{-7}$ mol as Zr) was transferred into the cell inside the glove-box. n-heptane (50 mL) was introduced into the cell using a hypodermic syringe. Polymerization was initiated by the addition of MAO in toluene ($4.0 \times 10^{-4}$ mol as Al), keeping Al/Zr mol ratio 5000. The reaction temperature was maintained at 60° C. by circulating water from a thermostat through the jacket of the cell and the gas-burette. Ethylene uptake was measured as function of time. The reaction was terminated after ½ h by addition of acidified methanol. The polymer was filtered, washed with methanol and dried at 40° C. under vacuum.

Yield 1.2 g Activity: 31 Kg PE/g-Zr.h Intrinsic viscosity: 1.92 dL/g

EXAMPLE-10

Polymerization of ethylene was performed in a stilted glass cell at one atmosphere pressure using n-heptane as diluent. A gas burette with a reservoir containing silicone oil was used to feed ethylene continuously to the cell. The reaction cell was dried at 155° C. overnight and cooled under ethylene. 11.4 mg catalyst ($8.52 \times 10^{-7}$ mol as Zr) was transferred into the cell inside the glove-box. Xylene (50 mL) was introduced into the cell using a hypodermic syringe. Polynerization was initiated by the addition of MAO in toluene ($4.3 \times 10^{-4}$ mol as Al), keeping Al/Zr mol ratio 5000. The reaction temperature was maintained at 80° C. by circulating water from a thermostat through the jacket of the cell and the gas-burette. Ethylene uptake was measured as function of time. The reaction was terminated after ½ h by addition of acidified methanol. The polymer was filtered, washed with methanol and dried at 40° C. under vacuum.

Yield: 0.82 g Activity: 21 Kg PE/g-Zr.h Intrinsic viscosity: 1.50 dL/g

EXAMPLE-11

Polymerization of ethylene was performed in a stirred glass cell at one atmosphere pressure using n-heptane as diluent. A gas burette with a reservoir containing silicone oil was used to feed ethylene continuously to the cell. The reaction cell was dried at 155° C. overnight and cooled under ethylene. n-heptane (50 mL) was introduced into the cell using a hypodermic syringe. $Cp_2ZrCl_2$ dissolved in xylene was added ($9.54 \times 10^{-7}$ mol as Zr) into the solvent. Polymerization was initiated by the addition of MAO in toluene ($4.8 \times 10^{-4}$ mol as Al), keeping Al/Zr mol ratio 5000. The reaction temperature was maintained at 70° C. by circulating water from a thermostat through the jacket of the cell and the gas-burette. Ethylene uptake was measured as function of time. The reaction was terminated after ½ h by addition of acidified methanol. The polymer was filtered, washed with methanol and dried at 40° C. under vacuum.
Yield: 1.7 g
Activity: 45 Kg PE/g-Zr.h
Intrinsic viscosity: 0.812 dL/g

EXAMPLE-12

50 mL of xylene were (previously treated with trimethylaluminum) introduced under $N_2$ atmosphere into a stainless steel Sotelem reactor with a capacity of 500 mL, equipped with a stirrer rotating at 1800 rpm and with a heating and cooling system. The reactor was heated to 200° C. and cooled under $N_2$ to a temperature 90±2° C. A stainless steel reservoir was used to feed ethylene continuously. 10.6 mg of previously prepared catalyst ($7.1 \times 10^{-7}$ mol as Zr) along with 20 mL xylene was transferred into the reactor by means of a separating funnel. Another 30 mL of xylene was added to the reactor through the separating funnel. The solvent was saturated with ethylene. Polymerization was initiated by the addition of MAO in toluene ($3.55 \times 10^{-3}$ mol as Al), keeping Al/Zr mol ratio 5000 and a ethylene pressure of 5 bar. The reaction was terminated after ½ h by adding acidified methanol. The polymer was filtered, washed with methanol and dried at 40–50° C. under vacuum.
Yield: 15 g
Activity: 461 kg PE/g-Zr.h
Intrinsic viscisity: 2.36 dL/g; MWD: 1.89

EXAMPLE-13

50 mL of xylene were (previously treated with trimethylaluminum) introduced under $N_2$ atmosphere into a stainless steel Sotelem reactor with a capacity of 500 mL, equipped with a stirrer rotating at 1800 rpm and with a heating and cooling( system. The reactor was heated to 200° C. and cooled under $N_2$ to a temperature 100±3° C. A stainless steel reservoir was used to feed ethylene continuously. 11.4 mg of previously prepared catalyst ($8.4 \times 10^{-7}$ mol as Zr) along with 20 mL xylene was transferred into the reactor by means of a separating funnel. Another 30 mL of xylene was added to the reactor through the separating funnel. The solvent was saturated with ethylene. Polymerization was initiated by the addition of MAO in toluene ($4.2 \times 10^{-3}$ mol as Al), keeping Al/Zr mol ratio 5000 and a ethylene pressure of 5 bar. The reaction was terminated after ½ h by adding acidified methanol. The polymer was filtered, washed with methanol and dried at 40–50° C. under vacuum.
Yield: 19 g Activity: 490 kg PE/g-Zr.h
Intrinsic viscosity: 2.3 dL/g

EXAMPLE 14

50 ml of xylene were (previously treated with trimethylaluminum) introduced under $N_2$ atmosphere into a stainless steel Sotelem reactor with a capacity of 500 mL, equipped with a stirrer rotating at 1800 rpm and with a heating and cooling system. The reactor was heated to 200° C. and cooled under $N_2$ to a temperature 80° C. A stainless steel reservoir was used to feed ethylene and hydrogen continuously 9.2 mg of previously prepared catalyst ($6.75 \times 10^{-7}$ mol as Zr) along with 20 mL xylene was transferred into the reactor by means of a separating funnel. Another 30 mL of xylene was added to the reactor through the separating funnel. 200 mL of hydrogen was introduced into the reservoir. The solvent was saturated with ethylene and hydrogen mixture. Polymerization was initiated by the addition of MAO in toluene ($3.37 \times 10^{-3}$ mol as Al), keeping Al/Zr mol ratio 5000 and maintaining pressure of 5 bar. The reaction was terminated after ½ h by adding acidified methanol. The polymer was filtered, washed with methanol and dried at 40–50° C. under vacuum.
Yield: 12.4 g
Activity: 402 kg PE/g-Zr.h
Intrinsic viscosity: 1.29 dL/g; MWD: 2.28

EXAMPLE-15

50 mL of xylene were (previously treated with trimethylaluminum in order to remove the impurities) introduced under $N_2$ atmosphere into a stainless steel Sotelem reactor with a capacity of 500 mL, equipped with a stirrer rotating at 1800 rpm and with a heating and cooling system. The reactor was heated to 200° C. and cooled under $N_2$ to a temperature 85° C. A stainless steel reservoir was used to feed ethylene and hydrogen continuously 8.8 mg of previously prepared catalyst ($6.46 \times 10^{-7}$ mol as Zr) along with 20 mL xylene was transferred into the reactor by means of a separating funnel. Another 30 mL of xylene was added to the reactor through the separating funnel. 100 mL of hydrogen was introduced into the reservoir. The solvent was saturated with ethylene and hydrogen mixture. Polymerization was initiated by the addition of MAO in toluene ($3.23 \times 10^{-3}$ mol as Al), keeping Al/Zr mol ratio 5000 and maintaining pressure of 5 bar. The reaction was terminated after ½ h by adding acidified methanol. The polymer was filtered, washed with methanol and dried at 40–50° C. under vacuum.
Yield: 13.3 g
Activity: 455 kg PE/g-Zr.h
Intrinsic viscosity: 1.53 dL/g; MWD: 2.09

EXAMPLE-16

50 mL of xylene were (previously treated with trimethylaluminum) introduced under $N_2$ atmosphere into a stainless steel Sotelem reactor with a capacity of 500 mL, equipped with a stirrer rotating at 1800 rpm and with a heating and cooling system. The reactor was heated to 200° C. and cooled under $N_2$ to a temperature 90° C. A stainless steel reservoir was used to feed ethylene and hydrogen continuously. 9.2 mg of previously prepared catalyst (6.75× $10^{-7}$ mol as Zr) along with 20 mL xylene was transferred into the reactor by means of a separating funnel. Another 30 mL of xylene was added to the reactor through the separating funnel. 400 mL of hydrogen was introduced into the reservoir. The solvent was saturated with ethylene and hydrogen mixture. Polymerization was initiated by the addition of MAO in toluene (3.37×$10^{-3}$ mol as Al), keeping Al/Zr mol ratio 5000 and maintaining pressure of 5 bar. The reaction was terminated after ½ h by adding acidified methanol. The polymer was filtered, washed with methanol and dried at 40–50° C. under vacuum.
Yield: 8 g
Activity: 276 kg PE/g-Zr.h; MWD: 1.92
Intrinsic viscosity: 1.37 dL/g

EXAMPLE-17

Copolymerization of ethylene and 1-hexene was performed in a stirred glass reactor at one atmosphere pressure using xylene as diluent. A gas-burette with a reservoir containing silicone oil was used to feed ethylene continuously to the cell. The reaction cell was dried at 155° C. overnight and cooled under ethylene. 16.4 mg catalyst (5.932×$10^{-7}$ mol as Zr) was transferred into the cell inside the glove-box. Xylene (50 mL, previously treated with trimethylaluminum) was introduced into the cell using a hypodermic syringe followed by addition of 1-hexene (8.056×$10^{-3}$ mol). Polymerization was initiated by the addition of methylaluminoxane in toulene (3.0×$10^{-3}$ mol as Al), keeping Al/Zr mol ratio 5000. The reaction temperature was maintained at 70° C. The reaction was terminated after ½ h by addition of acidified methanol. The polymer was filtered, washed with methanol and dried at 40° C. under vacuum.
Yield: 1.75 g
Activity: 65 Kg PE/g-Zr.h
Intrinsic viscosity: 0.416 dL/g
Crystallinity: 44.5%

EXAMPLE-18

Copolymerization of ethylene and 1-hexene was performed in a stirred glass reactor at one atmosphere pressure using xylene as diluent. A gas-burette with a reservoir containing silicone oil was used to feed ethylene continuously to the cell. The reaction cell was dried at 155° C. overnight and cooled under ethylene. 16.6 mg catalyst (6.0×$10^{-7}$ mol as Zr) was transferred into the cell inside the glove-box. Xylene (50 mL, previously treated with trimethylaluminum) was introduced into the cell using a hypodermic syringe followed by addition of 1-hexene (0.012 mol). Polymerization was initiated by the addition of methylaluminoxane in toulene (3.0×$10^{-3}$ mol as Al), keeping Al/Zr mol ratio 5000. The reaction temperature was maintained at 70° C. The reaction was terminated after ½ h by addition of acidified methanol. The polymer was filtered, washed with methanol and dried at 40° C. under vacuum.
Yield: 1.53 g
Activity: 77 Kg PE/g-Zr.h
Intrinsic viscosity: 0.189 dL/g; MWD: 2.7
Crystallinity: 33%

EXAMPLE-19

80 mL of xylene were (previously treated with trimethylaluminum) introduced under $N_2$ atmosphere into a stainless steel Sotelem reactor with a capacity of 500 mL, equipped with a stirrer rotating at 1800 rpm and with a heating and cooling system. The reactor was heated to 200° C. and cooled under $N_2$ to a temperature 90° C. A stainless steel reservoir was used to feed ethylene continuously. $Cp_2ZrCl_2$ dissolved in xylene was added (8.61×$10_{-7}$ mol as Zr) into the cell by means of a syringe. Another 20 mL xylene was added through a hypodermic syringe. The solvent was saturated with ethylene. Polymerization was initiated by the addition of MAO in toluene (4.3×$10^{-3}$ mol as Al). keeping Al/Zr mol ratio 5000 and maintaining pressure of 5 bar. The reaction was terminated after ½ h by adding acidified methanol. The polymer was filtered, washed with methanol and dried at 40–50° C. under vacuum.
Yield: 20 g
Activity: 306 kg PE/g-Zr.h
Intrinsic viscosity: 1.02 dL/g; MWD: 1.87

So it is observed from an examination of comparative example with those of examples that the catalyst supported on magnesium chloride confers an unusual benefits in terms of catalyst activity, increases molecular weight. The beneficial effect of the zirconium based metallocene catalyst supported on magnesium chloride is unexpected and unanticipated.

We claim:

1. A process for the polymerization and co-polymerization of olefins, which comprises pretreating a solvent with an organoaluminum compound to remove impurities of the solvent to form a pretreated solvent; mixing the pretreated solvent with a supported metallocene catalyst and initiating polymerization of the olefins by adding a mixture of an aluminoxane and a hydrocarbon medium, at a temperature in the range of 50 to 150° C., at a pressure ranging between 1 to 20 bar, for a period of 10 minutes to 10 hours; separating the polymer; and drying the polymer to remove the solvent to obtain the product.

2. The process as claimed in claim 1 wherein the process is conducted at a temperature in the range of 40 to 125° C., at a pressure range between 1 to 10 bar and for a period in the range of 15 to 60 minutes.

3. The process as claimed in claim 1 wherein, the olefin is selected from ethylene, propylene, α-olefins.

4. The process as claimed in claim 1 wherein the mixture of olefin monomers used for the co-polymerization may consist of ethylene and a second monomer which may be selected from propylene, 1-butene, 1-hexene, 1-octene, 4-methyl-1-pentene, and cyclic olefins such as norbornene, cyclohexene, 2-viny-5-norbornene.

5. The process as claimed in claim 1 wherein the solvent used in the reaction is selected from toluene, xylene, n-hexane, n-heptane.

6. The process as claimed in claim 1 wherein the supported metallocene catalyst has the formula;

wherein X is selected from the group consisting of Cl, Br and I;

M indicates the transition metal which are selected from the groups IIB, IIIB, IVB, VB, and VIB of the Periodic Table;

ED is an electron donor compound;

a is 1 to 30;

b is 2 to 80;

c is 0.001 to 0.1;

d is 0.002 to 0.2;

Cp=Cyclopentadienyl.

7. The process as claimed in claim 1 wherein the aluminoxane co-catalyst is selected from methylaluminoxane, ethyl-aluminoxane, hexaisobutyl-aluminoxane.

8. The process as claimed in claim 1 wherein the metallocene catalyst is partially or completed soluble in the solvent.

9. The process as claimed in claim 1 wherein the organoaluminium compound is selected from trimethylaluminium, triisobutlyaluminium, triethylaluminium.

10. The process as claimed in claim 1, wherein said supported metallocene catalyst is a zirconium metallocene catalyst.

11. The process as claimed in claim 7, wherein the aluminoxane cocatalyst is methyl-aluminoxane.

12. The process as claimed in claim 10, wherein the mole ratio of Al/Zr ranges between 500 to 10,000.

13. The process as claimed in claim 12 wherein the mole ratio of Al/Zr is 1000 to 5000.

14. The process as claimed in claim 9, wherein the organoaluminium compound is trimethylaluminium.

15. The process according to claim 1, wherein said separating the polymer is by washing said polymer with an organic solvent.

16. The process according to claim 3, wherein the olefin is ethylene.

17. The process according to claim 5, wherein the solvent is xylene.

18. The process according to claim 6, wherein X is Cl.

19. The process according to claim 6, wherein a is 2 to 3.5.

20. The process according to claim 6, wherein b is 1.5 to 3.

21. The process according to claim 6, wherein said supported metallocene catalyst has the formula $MgCl_{2.1}THF_{2.01}Zr_{0.017}CP_{0.034}$ wherein THF is tetrahydrofuran.

* * * * *